United States Patent [19]

Priest et al.

[11] Patent Number: 4,977,665
[45] Date of Patent: Dec. 18, 1990

[54] TRANSFORMER DISMANTLING SALVAGE SYSTEM

[75] Inventors: Richard J. Priest; Richard J. Priest, Jr., both of Jacksonville, Ark.

[73] Assignee: Jimelco, Inc., Jacksonville, Ark.

[21] Appl. No.: 403,300

[22] Filed: Sep. 5, 1989

[51] Int. Cl.$^5$ .............................................. B23P 19/04
[52] U.S. Cl. ...................................... 29/564.3; 29/762
[58] Field of Search ................ 29/564.1, 564.3, 566.1, 29/566.3, 762, 798, 596, 801, 33 R, 33 P, 822, 403.3, 426.5; 83/30, 51

[56] References Cited

U.S. PATENT DOCUMENTS

| | | | |
|---|---|---|---|
| 2,723,443 | 11/1955 | McKibben | 29/426.5 |
| 3,146,520 | 9/1964 | D'Eustachio | 29/762 |
| 4,016,639 | 4/1977 | Dombrowski et al. | 29/426.4 X |
| 4,144,638 | 3/1979 | Harris | 29/762 |
| 4,218,818 | 8/1980 | Panzica | 29/564.3 X |

FOREIGN PATENT DOCUMENTS

| | | | |
|---|---|---|---|
| 847448 | 7/1981 | U.S.S.R. | 29/762 |
| 860219 | 8/1981 | U.S.S.R. | 29/762 |

Primary Examiner—William Briggs
Attorney, Agent, or Firm—Stephen D. Carver

[57] ABSTRACT

An automated system for forcibly dismantling used power transformers so that their metal constituents may be recovered for recycling. A rigid, generally cubicle frame is supported upon a suitable concrete floor. A cutting carriage is independently suspended from suitable rails attached to the frame for slidable movements toward or away from a receiving station into which transformer to be processed are conveyed. The cutter carriage includes a removable cutter blade configured to compressively shear transformer windings. The cutter carriage cooperates with a reciprocating attack carriage which is slidably suspended for independent movements toward or away from the receiving station. The attack carriage comprises an attack blade having at least one outwardly projecting penetrator which initially stabs and captures transformer to be processed. Both carriages may be hydraulically moved towards or away from each other. The attack carriage is preferably suspended from the cutter carriage. When compressed together shearing elements associated with the cutter blade and a specially configured attack plate quickly cut through transformers to aid in the recycling of their metal cores and windings. Transformers delivered to the receiving station may be lifted into a vulnerable attack position by an elevator. After a transformer is conveyed to the receiving station, it is preferably braced by a pusher plate prior to penetration by the attack system.

46 Claims, 10 Drawing Sheets

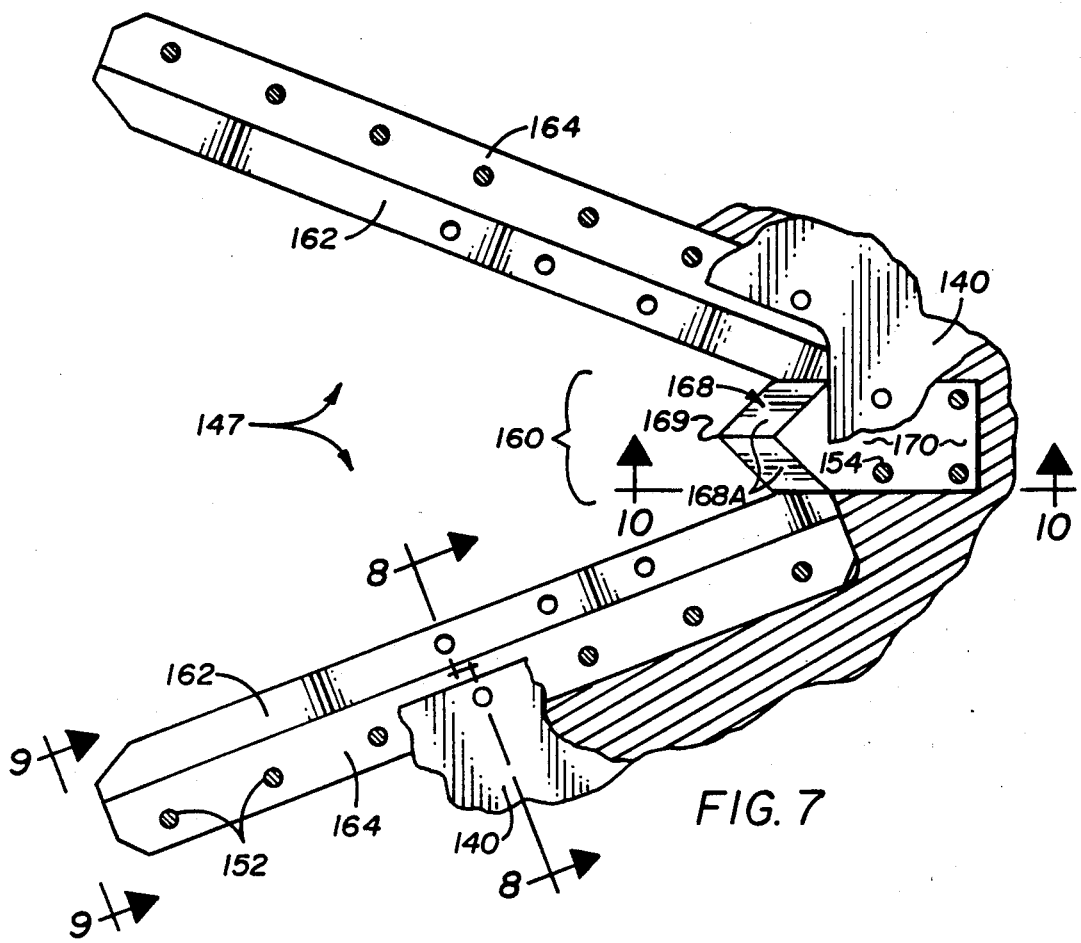
FIG. 9
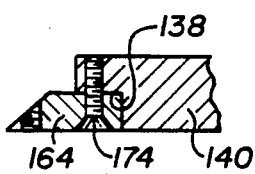
FIG. 8
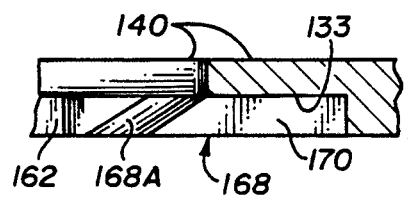
FIG. 10

4,977,665

TRANSFORMER DISMANTLING SALVAGE SYSTEM

BACKGROUND OF THE INVENTION

The present invention relates generally to processing of wastes, and the recovery and recycling of certain metals. More particularly, the present invention is directed to a transformer dismantling and salvaging system wherein heavy duty power transformers are mechanically demolished so that the constituent metals can be recovered for subsequent recycling.

Heavy duty industrial and utility power transformers of the Three kilovolt- ampere and 500 and above kilovolt-ampere range are in widespread use. Such transformers have, on the average, a useful life expectancy of between five to fifteen years, depending upon a variety of factors. Transformers subjected to light use which have been erected in well shielded areas, for example, may survive for upwards of twenty years. Their less fortunate counterparts, exposed to lightening hits or mechanical damage from wind or tornadoes may be removed from service in a much shorter time. In any event the vast quantities of used and no longer useful transformers accumulating across the country present a difficult solid waste problem.

It is known in the salvage business to demolish or strip used power transformers to recover their metal constituents. A variety of problems exist in such work however, and there are a number of dangers as well. Many transformers produced up until the 1970's were filled with transformer oil containing dangerous polychlorinated biphenyl (PCB) compounds. While PCB transformer oil is no longer used in new transformers, it still can be found in older transformers which are subject to recycling. Moreover, almost all power transformers are filled with some type of oil, and current EPA regulations establish strict guidelines for the disposal of such oils.

From a transformer salvaging standpoint, the important thing is to properly capture and contain the oil for subsequent transfer to appropriate specialists for disposal. The problem of capturing transformer oil is extremely aggravating, since the stripped transformers are heavy, cumbersome and difficult to maneuver by laborers. Since, at present, the recycling work is done manually, an opportunity for exposure to such chemicals exists.

It is known in the salvage business that transformer cores are of value. The laminated steel material may be recycled, and if disposal has been done properly, the entire core may be reused, substantially as is. If the core is obsolete or is otherwise damaged, it may end up as scrap metal for subsequent resmelting. Likewise, the metal windings of the transformer are valuable. At present transformers are manually taken apart with hammers, saws, and the other hand tools. The copper or aluminum windings are then manually removed from the transformer debris. The recovered windings are incinerated to remove the paper, varnish or other coverings, and then the recovered metal is resmelted. Of course it is recognized that the resmelting of recovered metal is more efficient than the processing of new raw ores.

Power transformers of the type contemplated herein involve shell type transformers and core-form transformers. The shell type of transformer consists of two cores both of which are penetrated by one band of windings. In other words the primary winding and the various secondaries are all wound in a single band which extends between the centers of the mutually coupled, adjacent cores. Modern high power transformers are of the core-form type. These consist of one heavy magnetic core, which includes a pair of windings disposed about its opposite legs. The primary advantage of a core form transformer is that the mean length turn of the windings is reduced.

Hence core form transformers are more efficient and generate less heat. However, in the past they have been more difficult to manufacture, and when worn out, they have been more difficult to disassemble. In any event it is necessary to consider modifications to hardware to accomplish the processing of all types of high power transformers in a viable recovery system.

SUMMARY OF THE INVENTION

The present invention comprises an automated system for forcibly dismantling used power transformers. Reciprocating cutting apparatus slidably disposed upon an elongated, upright rigid frame is adapted to quickly cut through transformers to aid in the recycling of their metal constituents.

The transformer dismantling system preferably comprises a rigid generally vertically upright frame supported upon a suitable concrete slab. Separate cutter and attack carriages are movable with respect to the frame. The frame includes a pair of spaced apart and parallel sides which are suitably braced together. A conveyor is preferably employed to deliver transformers to a receiving station. The frame top supports a pair of spaced apart, parallel rails which suspend and support a a cutter carriage. The cutter is free to move longitudinally toward or away from the receiving station. A cutter blade adapted to have transformers forced into it for cutting is mounted upon a cutter blade mounting system associated with the cutter carriage. An associated attack carriage initiates the action. Suitable hydraulic power is employed to actuate both the attack and cutter carriages.

The attack system is slidable relative to the frame. Preferably it comprises an attack carriage coupled to the cutter carriage for slidable movements. The attack carriage comprises an elongated blade having an outwardly projecting penetrator projecting from it. Transformers delivered to the receiving station may be lifted into a vulnerable attack position by an elevator. The attack point is accessible both by the attack and cutter carriages.

After a transformer is conveyed to the receiving station, it is preferably braced by a pusher plate which is selectively deployed as necessary. The attack carriage is then hydraulically actuated, forcing the attack penetrator into the transformer windings After the transformer is thus forcibly stabbed by the attack penetrator point, it is captured, and the pusher plate may be moved out-of-the way. The cutter blade comprises a generally V-shaped notch which is adapted to slidably receive the transformer when the attack carriages and cutter carriages are moved together over the receiving station. As the attack plate moves in spaced apart parallel relation to the cutter plate, the transformer is sandwiched and sheared by the compression of the multiple shearing surfaces between which it is forcibly compressed.

Thus a primary object of the present invention is to provide an automated system for safely dismantling power transformers for subsequent salvaging and recycling.

Another object of the present invention is to provide a power transformer recycling system of the character described which will forcibly destroy the windings to expose their metal constituents without damaging the metallic core about which the windings are bound.

Yet another object of the present invention is to provide a transformer dismantling and salvage system of the character described which is adapted to be employed with both shell type power transformers and modern core form transformers.

A still further object of the present invention is to provide a power transformer recycling system which can easily handle power transformers having a kilovolt ampere (KVA) range from between 3 KVA to 500 KVA.

A further object of the present invention is to provide an automated system of the character described which easily recovers the core steel so that it may be returned to the smelters.

Another object of the present invention is to provide a transformer dismantling and recycling system of the character described which readily exposes the copper or aluminum windings of disassembled transformers for subsequent ease of recovery.

A still further object of the present recovery and recycling system is to provide a cutter and penetrator system which may be quickly modified on the job to adapt the machine for either shell type or core form transformers.

Yet another object of the present invention is to provide a power machine for transformer recycling which is adapted to readily align a transformer for subsequent cutting. It is a feature of the present invention that a pair of mutually reciprocally operable cutting and attack stations may be individually adjusted relative to the frame so as to accommodate the serial processing of transformers of different dimensions and characteristics.

A related object of the present invention is thus to provide a transformer dismantling and recycling machine of the character described which may be fed with a series of transformers of varying sizes and shapes.

Thus another object of the present invention is to provide a dismantling system of the character described which readily accommodates a wide variety of transformers of different shapes and sizes.

A still further object of the present invention is to provide a transformer conveying and feeding system adapted for use in conjunction with the system aforedescribed.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 7 is an enlarged, fragmentary plan view of the cutter blade assembly with portions thereof broken away or shown in section for clarity;

FIG. 8 is a sectional view taken generally along line 8—8 of FIG. 7;

FIG. 9 is a fragmentary end view taken generally along line 9—9 of FIG. 7;

FIG. 10 is a fragmentary sectional view taken generally along line 10—10 of FIG. 7;

DETAILED DESCRIPTION

Figure 1:
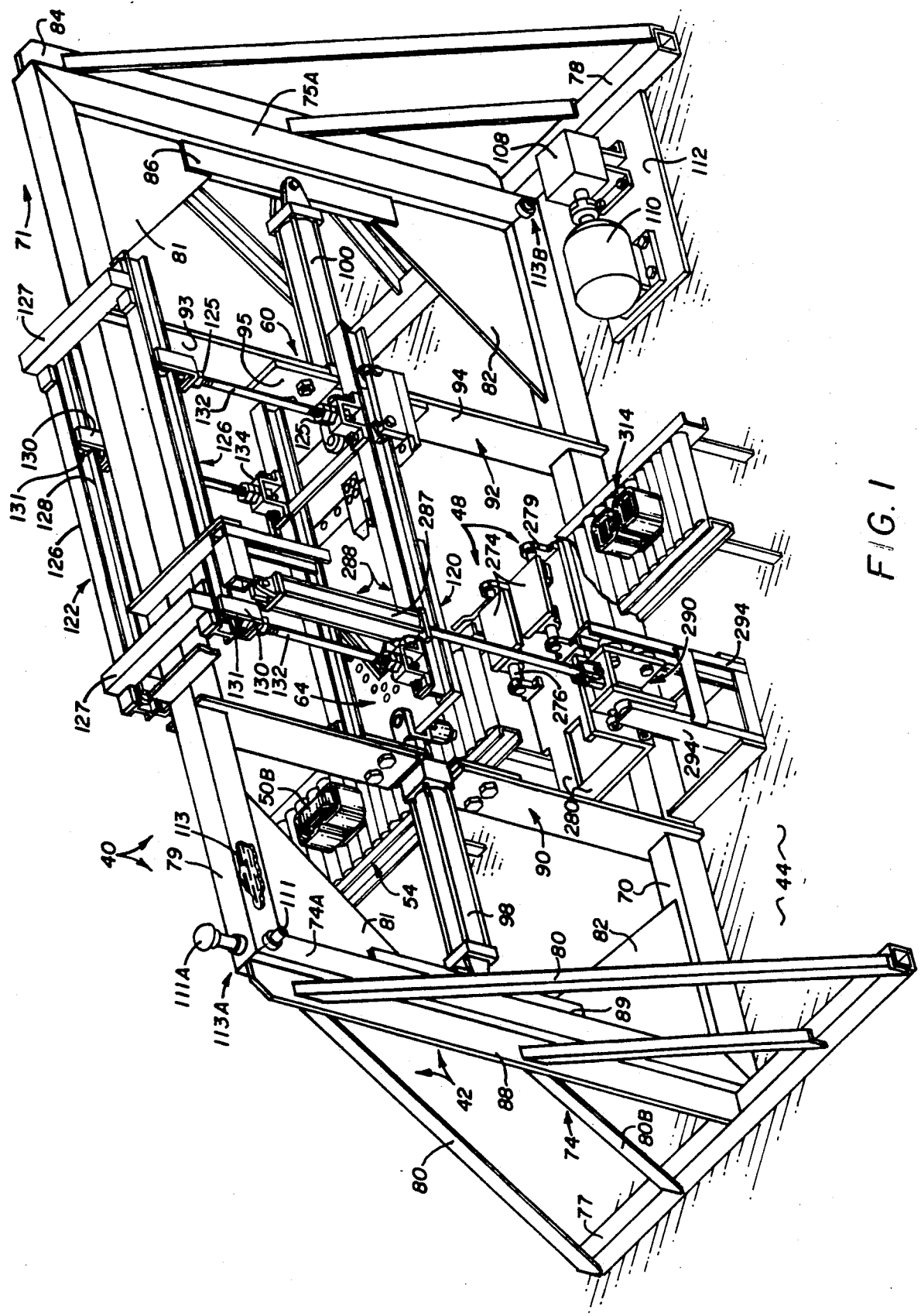
FIG. 1 is a fragmentary isometric view showing our TRANSFORMER DISMANTLING SALVAGE SYSTEM, with portions thereof broken away or shown in section for clarity.

With initial reference now directed to FIGS. 1 and 2, and FIGS. 2A through 2C, our system for dismantling distribution transformers has been generally designated by the reference numeral 40. System 40 comprises a rigid, somewhat cubical frame, generally designated by the reference numeral 42, which is operatively disposed upon a suitable supporting surface such as concrete floor 44. Thus as viewed in FIGS. 1, 2A and 2B, the frame presents a rather box-like interior appearance, and operative portions of the system to be described in detail hereinafter, are either substantially disposed within the frame interior or operatively communicate with it.

A receiving station, generally designated by the reference numeral 48, is approximately centered within the frame interior. It receives transformers 50 and 50B preferably inputted to the apparatus via a conventional conveyor 54 oriented transversely with respect to the frame. Conveyor 54 is preferably segmented, consisting of a pair of cooperating input and output portions disposed adjacent the receiving station. Once transported to the receiving station 48, the transformers are elevated into suitable position for destruction between the jaws of an attack system, generally designated by the reference numeral 60, and a cutter system, generally designated by the reference numeral 64. When the targeted transformer is appropriately positioned, it is forcibly cut apart, and the winding portion 51 is cut from the core 52. Thus as transformer 50B (FIG. 2B) moves along conveyor 54 towards the receiving station it will eventually assume the position occupied by transformer 50 for subsequent destruction. When the windings are separated from the core, the residue will flow outwardly of the receiving station down the conveyor.

Frame 40 comprises an elongated steel base 70 of rigid tube stock extending at the frame bottom between a pair of vertically upright rigid sides, generally designated by the reference numerals 74 and 75. The generally triangular sides 74 and 75 comprise vertical stanchions 74A and 75A of steel tube stock, which extend upwardly to the frame top, generally designated by the reference numeral 71. The transverse, tube stock frame feet 77 and 78 stabilize the frame at the bottom. Base 70 and feet 77, 78 form the bottom of the frame, lying flat upon the floor 44. An elongated, rigid tube stock beam 79 extends across the top of the frame between stanchions 74A and 75A, to which it is welded at both ends. Suitable reinforcement webs 81 brace beam 79 to stanchions 74A and 75A. Similar webs 82 in the bottom corners of the frame secure stanchions 74A and 75A to base 70 to provide further reinforcement. Side 75 additionally comprises an outer elongated reinforcement rail 84 welded to stanchion 75A, and an inner vertical brace 86 welded to the inside of stanchion 75A. The opposite side 74 of the frame is similar, comprising an outer reinforcement brace 88 welded to the outside of stanchion 74A, and an inner brace 89 welded to the inside face of stanchion 74A. Both frame sides preferably include triangular reinforcement braces Side 74 is angularly braced by a pair of downwardly diverging outer struts 80 extending between outer brace 88 and the transverse foot 77. Inner braces 80B are similarly deployed. Outer braces 80 form the sides of an isosceles triangle having foot 77 for a base, and the inner triangle formed by braces 80B and foot 77 is generally congruent.

Figure 2:
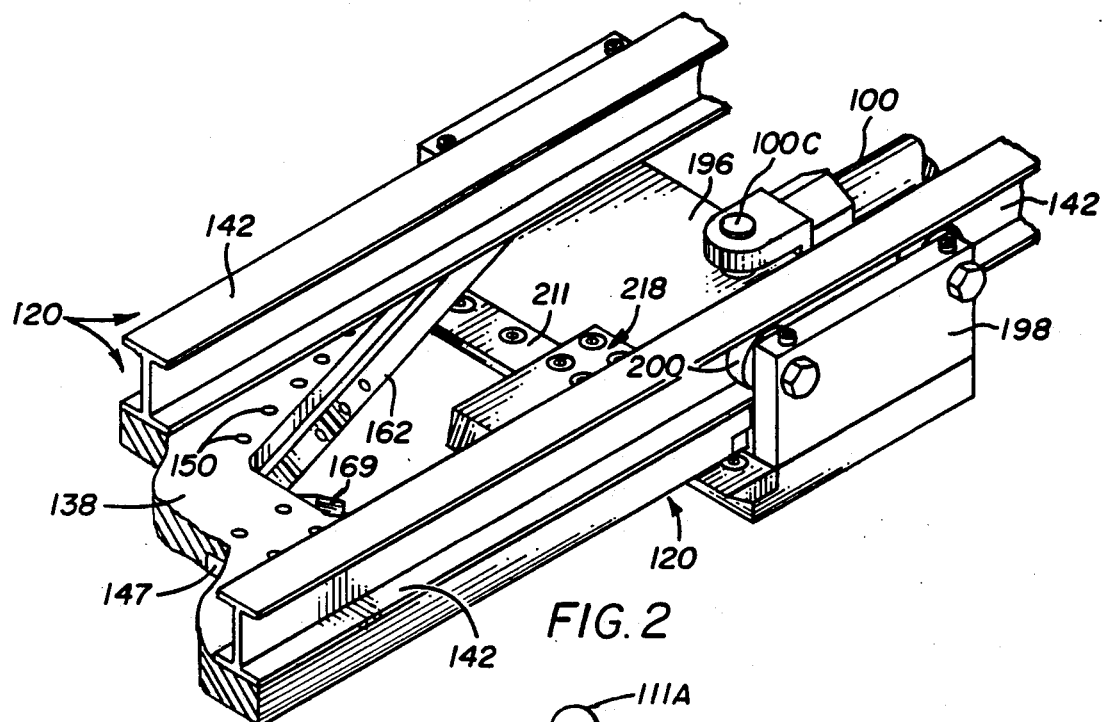
FIG. 2 is an enlarged, fragmentary isometric view showing the attack carriage and a segment of the cutter carriage, with portions thereof broken away or shown in section for clarity, or omitted for brevity.
Figure 2C:
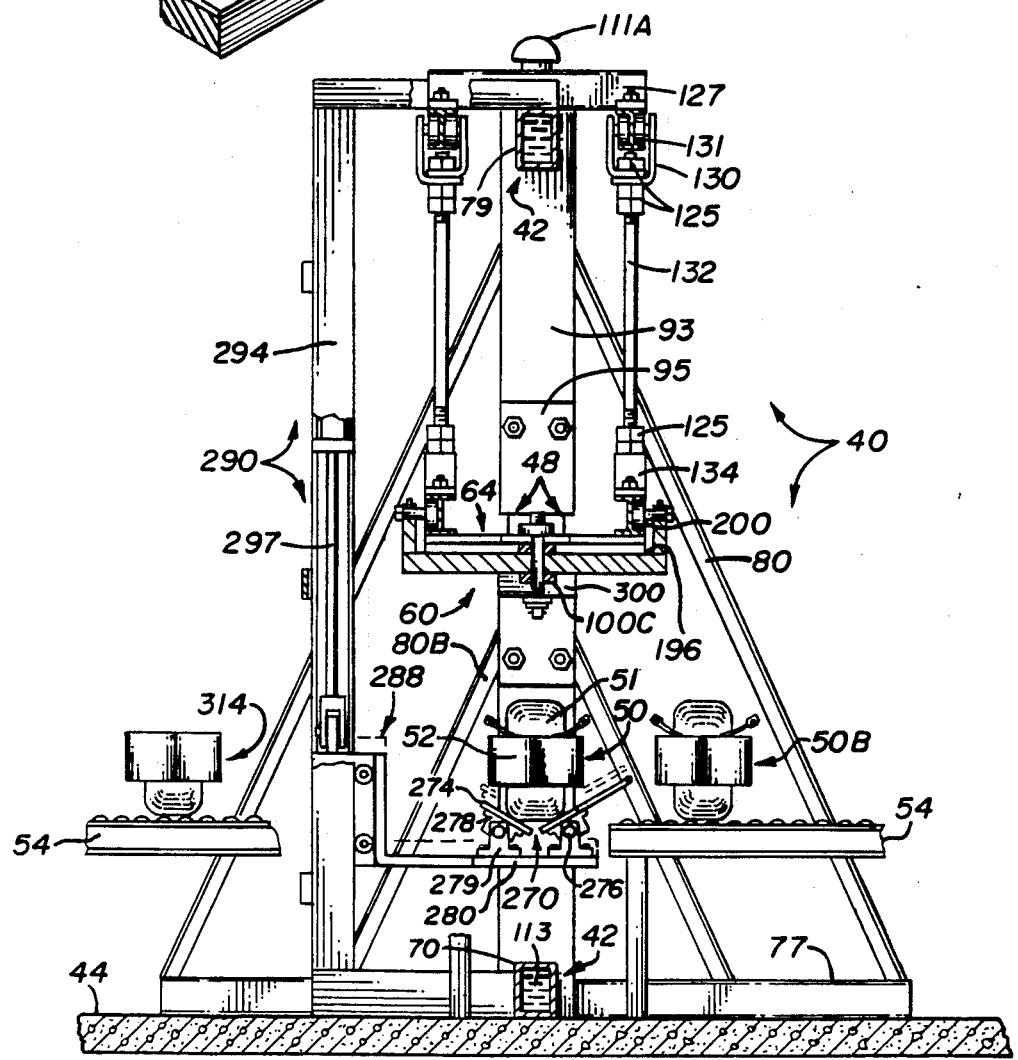
FIG. 2C is a fragmentary end elevational view taken generally along line 2C—2C of FIG. 2B, with portions thereof broken away or shown in section for clarity, or omitted for brevity.
Figure 2A:
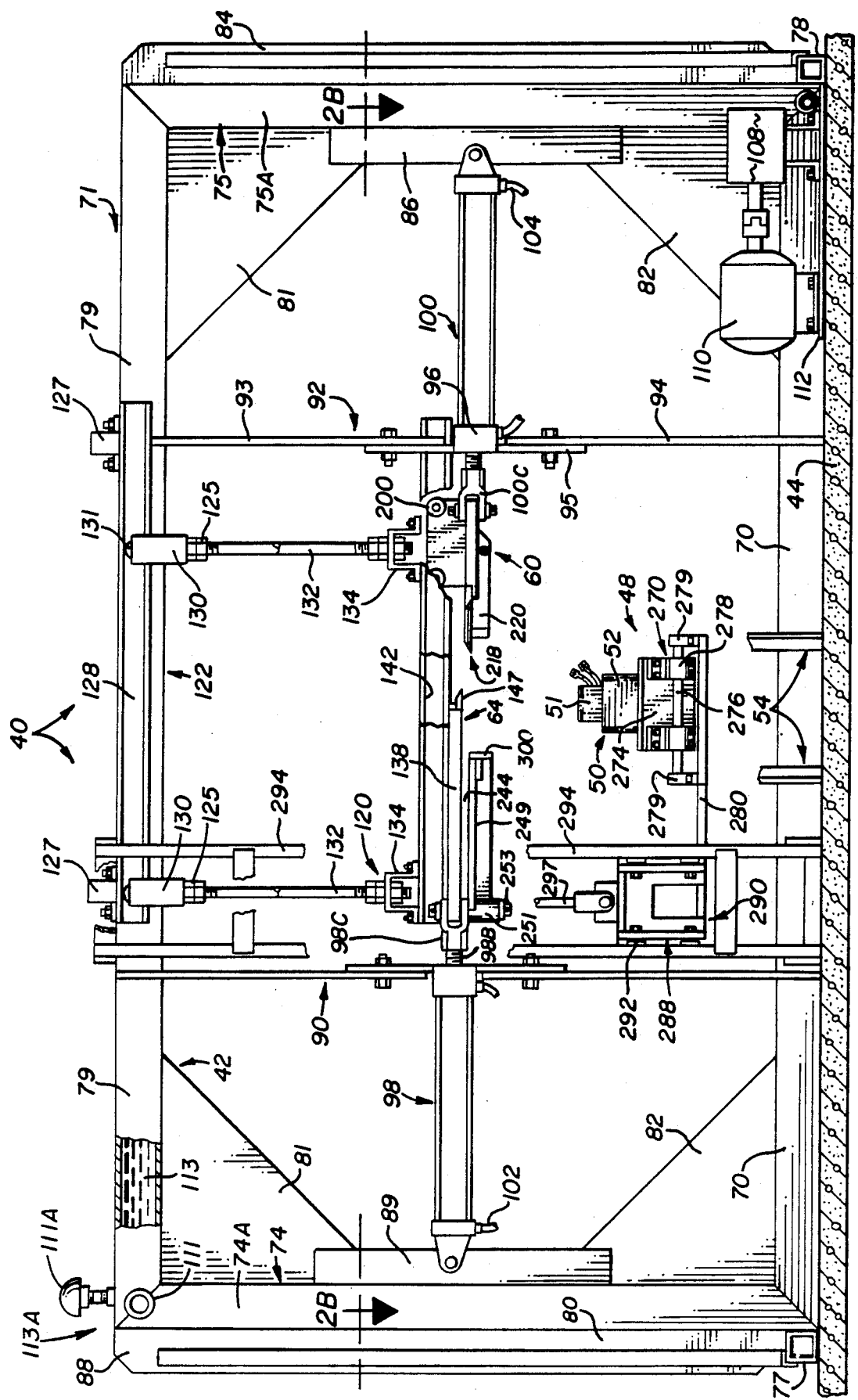
FIG. 2A is an enlarged, fragmentary side elevational view of our TRANSFORMER DISMANTLING SALVAGE SYSTEM, with portions thereof broken away or shown in section for clarity, or omitted for brevity.
Figure 2B:
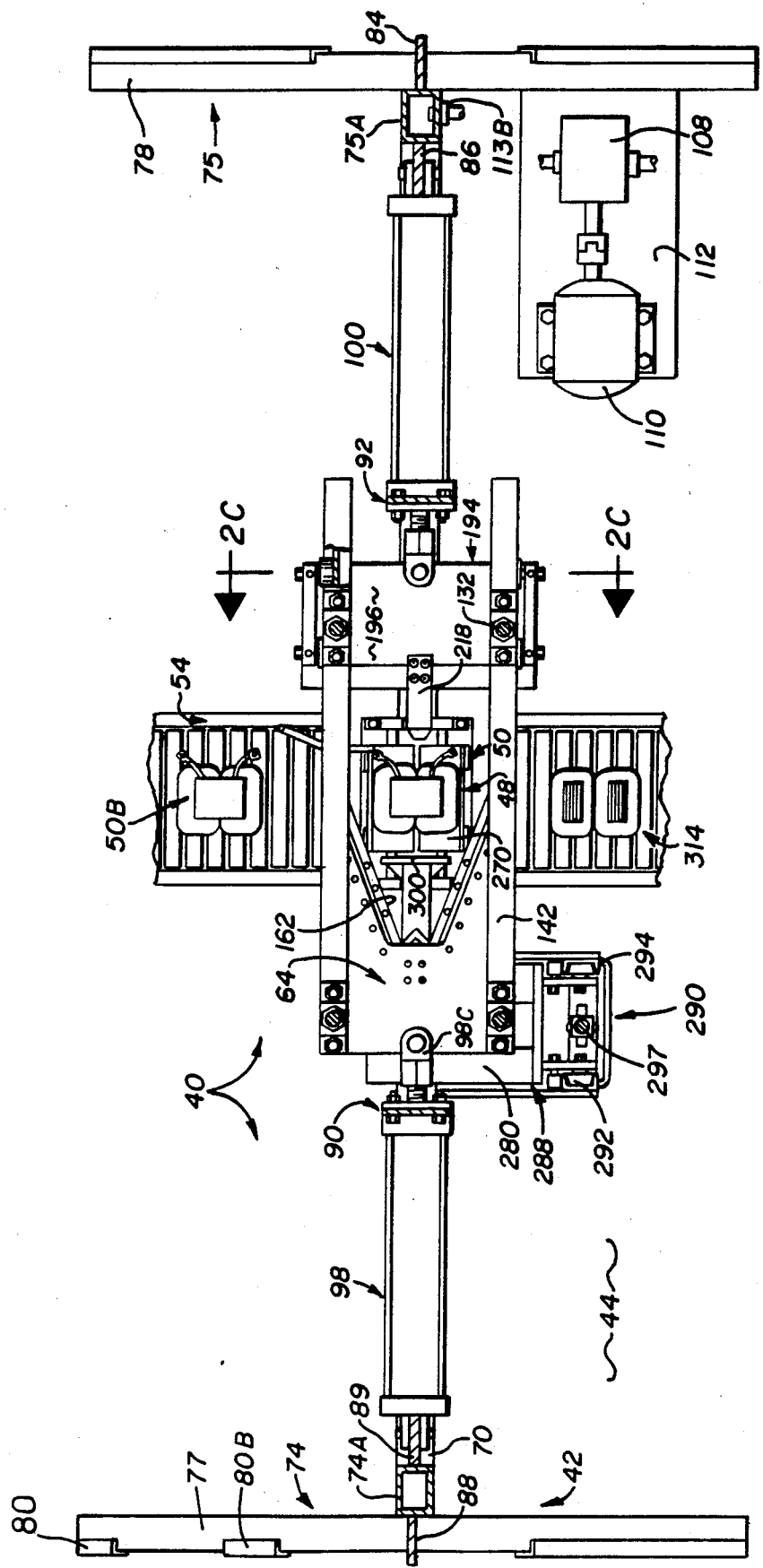
FIG. 2B is a fragmentary, sectional view taken generally along line 2B—2B of FIG. 2A.

As best viewed in FIG. 2A, frame 42 further comprises a pair of intermediate, segmented braces 90 and 92 which extend vertically within the interior of the frame between its base 70 and beam 79. The spaced apart and parallel braces 90, 92 are virtually identical, and they support the hydraulic cylinders which actuate the system, to be described later. Brace 92 comprises upper and lower portions 93, 94 respectively which terminate at and are bolted to an intermediate, apertured portion 95 which supports a cylinder head 96.

With additional reference directed now to FIGS. 3-6, both the cutter system 64 and the attack system 60 are slidably movable with respect to the frame. They are adapted to reciprocate horizontally above the receiving station 48 across that portion of the frame interior between the intermediate frame braces 90 and 92 previously discussed. Hydraulic cylinder 98 controls the cutter system 64, and cylinder 100 controls the attack system 60. Both cylinders slide carriage assemblies to be described in detail later. Cylinder 98 is mechanically pivoted to brace 89 with fitting 99, and it extends horizontally to brace 90.

Figure 24:
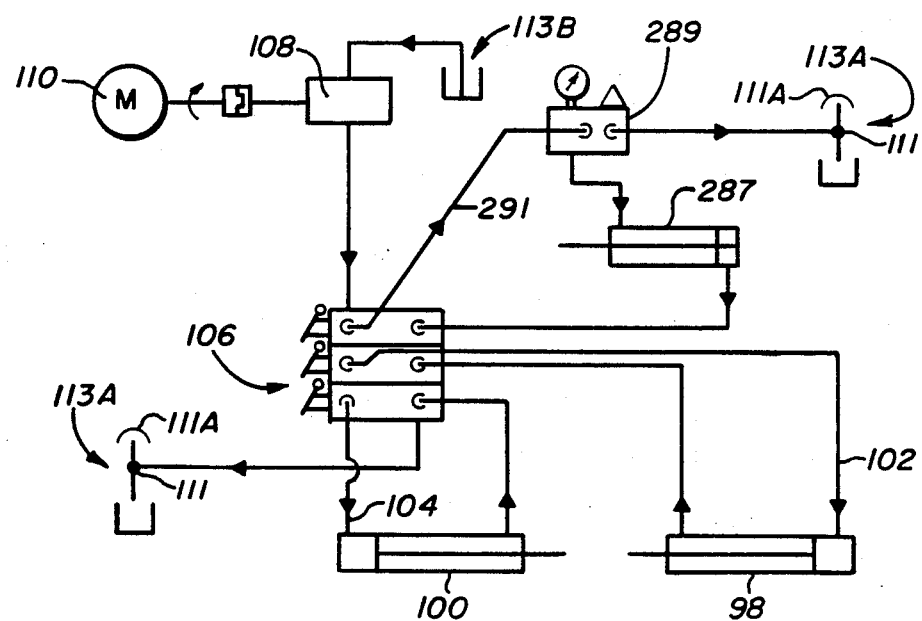

Hydraulic cylinder 100 (FIGS. 2A) extends between brace 86 and brace 92. The cylinders are actuated by conventional hydraulic lines 102, 104 (FIG. 24) which lead to a hydraulic valve control system generally designated by the reference numeral 106. A suitable hydraulic pump 108 is driven by a conventional electric motor 110. Both pump 108 and motor 110 are secured to a rigid frame mounting plate 112. The frame interior is preferably used as a fluid reservoir. Top beam 79, base 70, and side stanchions 74A and 75A have hollow interiors which are disposed in fluid flow communication. Fluid access is provided by fitting 111. Oil can be added to the system through vent 111A. Thus the interior of the frame forms a hydraulic reservoir for storage of hydraulic fluid 113 (FIG. 2A. The vented end of the reservoir has been generally designated by the reference numeral 113A (FIGS. 1, 24) and the suction end has been designated by the reference numeral 113B.

In the best mode the cutter system 64 is suspended from the frame by a cutter carriage generally designated by the reference numeral 120, and the attack carriage (to be discussed later) is dynamically suspended from the cutter carriage. It should be appreciated here that it is within the scope of the present invention to suspend the attack carriage directly to the frame and then couple the cutter carriage to it, or to separately suspend both carriages directly to the frame.

As best viewed in FIGS. 1, 2, 2A and 2B a generally rectangular suspension assembly 122 is disposed at the top of the frame. It includes a pair of parallel I-beam sides 126 supported by upper transverse struts 127 extending perpendicularly across top beam 79. I-beams 126 include guide rails 128 aligned on both sides of beam 79, and they are spaced apart from and parallel with it. Cutter carriage 120 is suspended from I-beam guides 128 by suitable roller couplings 130 which include roller wheels on its opposite sides, which wheels are captivated upon the guides 128 associated with each I-beam 126. Each of the couplings 130 is generally in the form of a U-shaped housing to appropriately position its captivated roller wheels within the guides 128 discussed. Adjustable suspension rods 132 extend downwardly from couplings 130 and are bolted to yokes 134 which support the carriage 120. Compression bolts 125 threadably secured to the opposite ends of the suspension rods 132 may be adjusted to vary carriage elevation.

Figure 3:
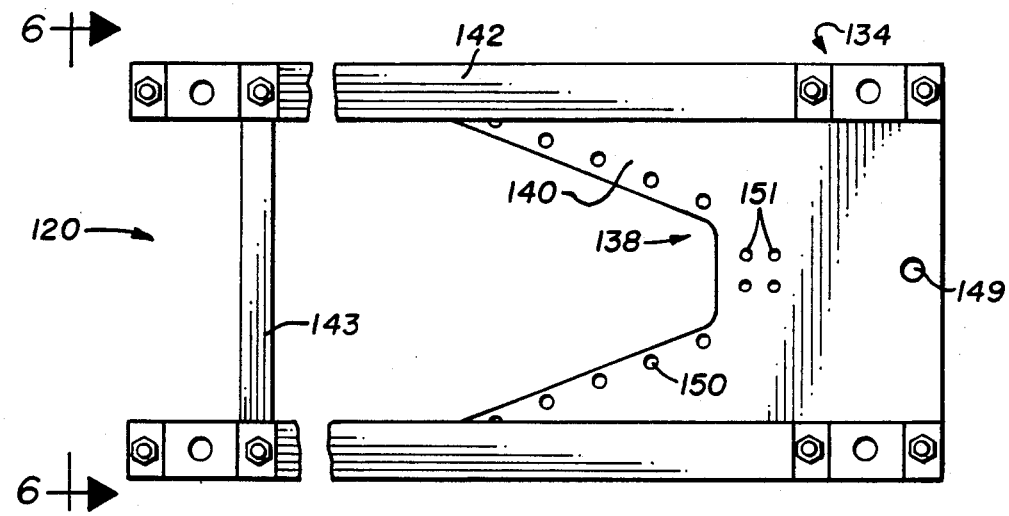
FIG. 3 is an enlarged, fragmentary top plan view of the cutting blade mounting plate.
Figure 4:
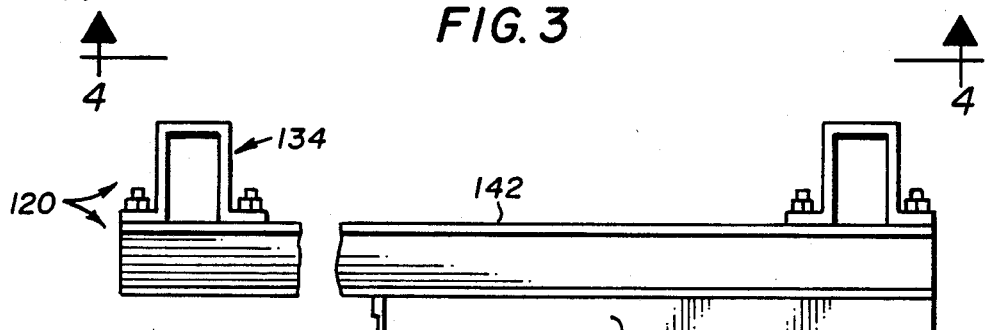
FIG. 4 is a fragmentary side elevational view taken generally along line 4—4 of FIG. 3.
Figure 5:
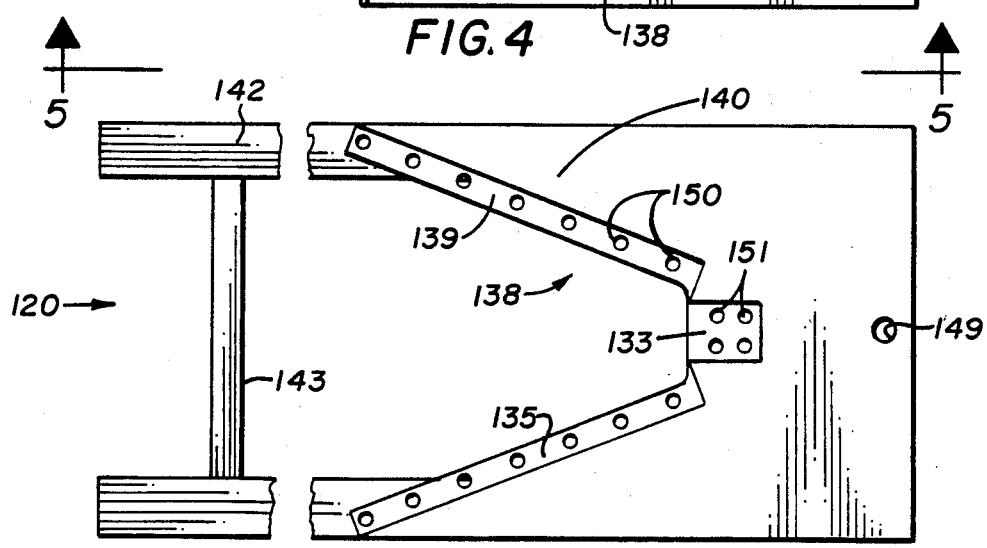
FIG. 5 is an enlarged, fragmentary bottom plan view of the cutting blade mounting plate taken generally along line 5—5 of FIG. 4.
Figure 6:
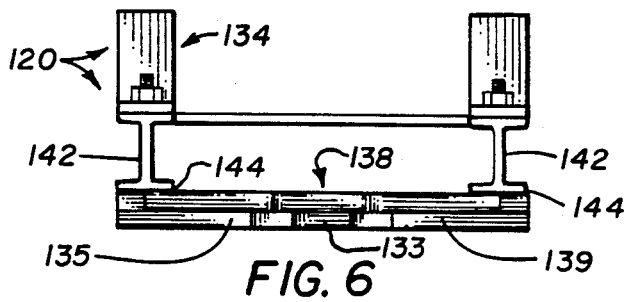
FIG. 6 is a fragmentary, end elevational view of the cutter blade mounting plate taken generally along line 6—6 of FIG. 3.

With reference now to FIGS. 2 and 3-10, the cutter carriage 120 comprises a rigid steel cutter mounting plate generally designated by the reference numeral 138. A generally planar mounting surface 140 extends between lower, spaced apart and parallel I-beams 142 (FIG. 6). Suitable recesses 135 and 139 are included to receive the cutter blade 147. I-Beams 142 are secured by a transverse brace 143 (FIGS. 3 and 5). The mounting plate 138 is attached below I-beams 142 and the outer weldments 144 extend in the direction of attack. Cylinder 98 includes a ram 98B terminating in a suitable clevis 98C which is bolted to the cutter mounting plate via orifice 149 (FIGS. 3, 5) to move carriage 120. Thus the cutter blade is rigid with and suspended by the carriage assembly 120 for reciprocal movement toward and away from the receiving station 48 in response to hydraulic pressure from cylinder 98.

The cutter blade 147 mounts beneath the cutter mounting plate 138 and it is snugly nested thereto. The outer recessed edges of the cutter mounting plate include a plurality of spaced apart orifices 150. The vertex region includes recessed region 133 having orifices 151. Blade 147 mates to the mounting plate within these recessed borders. In assembly, orifices 152 in the cutter blade 147 (FIG. 7) are aligned with cutter mounting plate orifices 150. Recesses 135 mate with the mounting edges 164 of the blade 147. The generally rectangular recessed region 133 receives the flange portion 170 of the blade 147, and orifices 154 must be aligned with mounting plate orifices 151. Suitable screws 174 (FIG. 8) secure the cutter blade. As best viewed in FIGS. 5 and 7, blade 147 is lifted up to the underside of cutter mounting plate 138, and its edges are appropriately aligned within the generally notch shaped interior of the cutter mounting plate.

Turning now to FIGS. 7-10, the cutter blade 147 comprises an open, generally V-shaped mouth generally designated by the reference numeral 160. The outwardly diverging sides thereof include sharpened hardened steel cutting edges 162 which are adjacent the unsharpened mounting edges 164 in which orifices 152 are defined. Mouth 160 is thus generally V-shaped, and preferably blade edges 162 form an angle of between 40 and 50 degrees with one another. As the cutter blade is compressed into a transformer, the transformer will be gradually wedged between edges 162 and forced towards the vertex formed by the intersecting blades. An outwardly diverging prong 168 having a transformer engaging point 169 is disposed at the vertex. The rear flange portion 170 of the prong 168 is aligned within recessed plate region 133 and mated with orifices 151 (FIG. 5). The cutting edges 162 of the cutter blade 147 are integral with the mounting edges 164. A suitable screw 174 (FIG. 7) is illustrated securing the mounting edge 164 within the recessed region 135 at the edge of the cutter mounting plate 138.

The cutter blade 147 will compressively cut the windings of a transformer forced into the mouth 160. Cutting is further enhanced by the attack means to be described in detail later, and by the forwardly projecting prong 168 whose edges 168A cooperate with cutting edges 162 to destroy the transformer.

Figure 11:
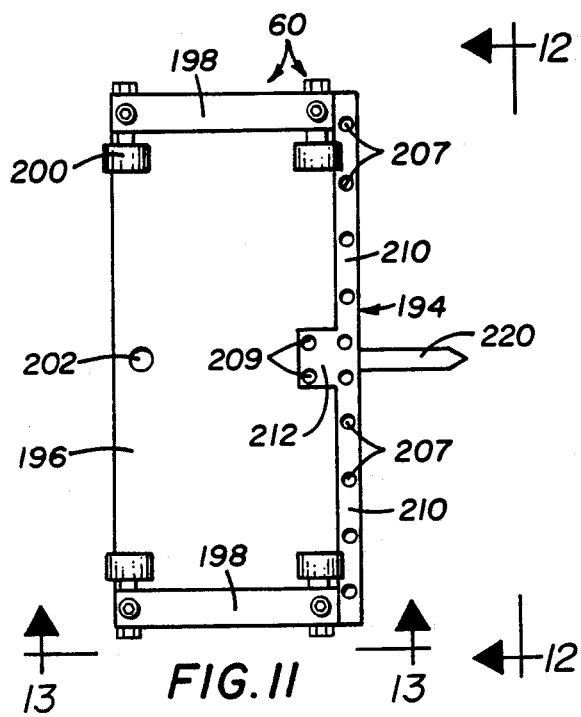
FIGURE 11 is an enlarged, top plan view of the transformer attack carriage.
Figure 12:
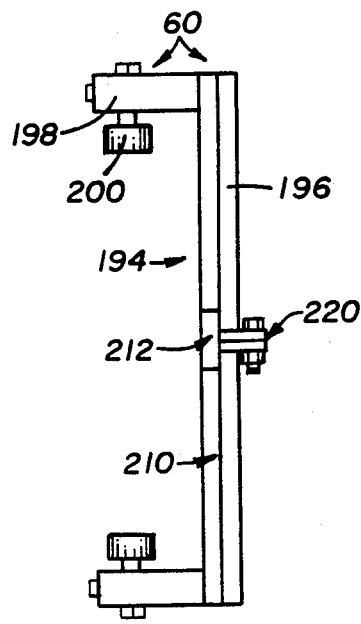
FIG. 12 is a side elevational view of the transformer attack carriage taken generally along line 12—12 of FIG. 11.
Figure 13:
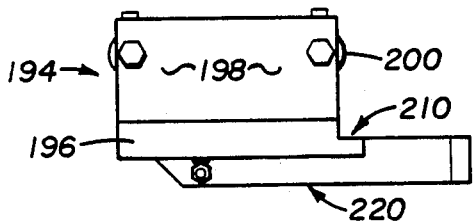
FIG. 13 is an end view of the transformer attack carriage taken generally along line 13—13 of FIG. 11.
Figure 14:
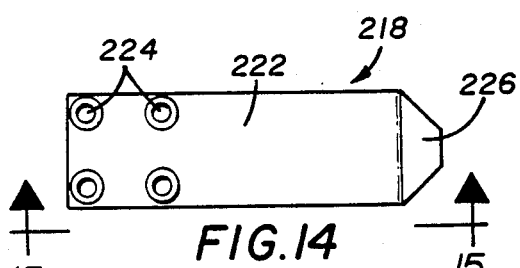
FIG. 14 is an enlarged top plan view of the transformer penetrator associated with the attack system.
Figures 15, 16:
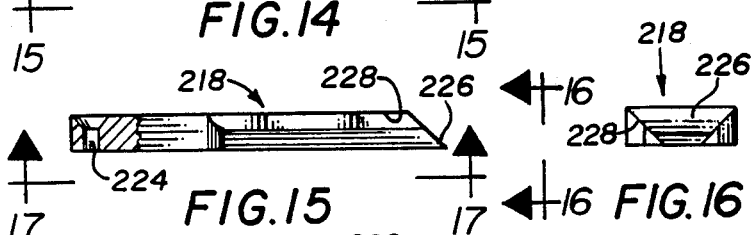
FIG. 15 is a fragmentary side elevational view taken generally along line 15—15 of FIG. 14; with portions thereof broken away for clarity.
FIG. 16 is an end view of the penetrator taken generally along line 16—16 of FIG. 15.

With primary reference directed now to FIGS. 1 through 2C and FIGS. 11 through 19, the preferred attack system 60 comprises an attack carriage generally designated by the reference numeral 194 (FIGS. 11, 12).

In the best mode the attack carriage is slidably coupled to and suspended from the cutter carriage 120 previously described. The attack carriage 194 comprises a rigid generally planar steel plate 196 which extends between a pair of oppositely disposed side rails 198. Rails 198 mount suitable wheels 200 which are rotatably captivated within the sides of the I-beams 142 in the cutter carriage 120. Plate 196 includes an orifice 202 to which the clevis 100C (FIG. 2A) of cylinder 100 is bolted to control the attack carriage.

As best viewed in FIGS. 11 and 12, the right side of the attack plate 196, which comprises a leading edge thereof, is recessed A plurality of spaced apart orifices 207 are defined in the recessed region 210 for securing the blades 211 (FIGS. 18 and 19) associated with the attack system. The central recess 212 (FIG. 12) includes orifices 209 for mounting the penetrator 218 (FIGS. 14–17). An outwardly projecting penetrator reinforcement bar 220 extends outwardly from the plate 196, for dynamically bracing the penetrator 218 when the attack carriage is deployed.

Penetrator 218 comprises a rigid, sharpened steel point which forwardly projects from the attack carriage and initially penetrates a transformer. The rigid steel body 222 includes a plurality of suitably internally chamfered mounting orifices 224 to secure the penetrator within recessed region 212 for alignment with orifices 209. The sharpened outwardly projecting edge 226 (FIG. 16) initially stabs the transformer. Destruction of the transformer is insured by the penetrator's tapered blade edges 228 defined along the bottom sides of plate 222. The penetrator 218 is backed up by a pair of attack blades 211 (FIG. 18) which are mounted upon its opposite sides within recesses 210. Blades 211 will contact the transformer after it has been first stabbed by penetrator 218, and then compressed against the cutter blade previously described. As viewed in FIG. 2A, the penetrator blade 218 is disposed in generally parallel relation slightly beneath the cutter blade 147.

Figure 19:
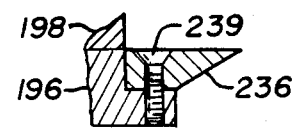
FIG. 19 is a fragmentary, sectional view taken generally along line 19—19 of FIG. 18.
Figure 20:
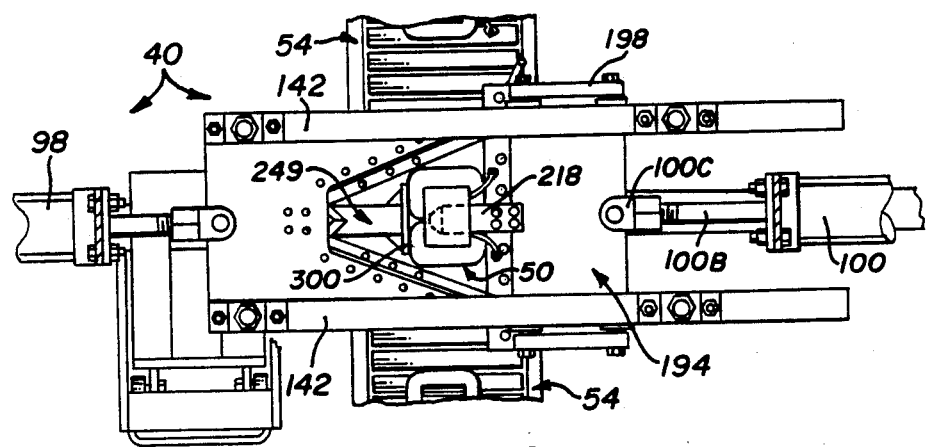
FIG. 20 is an enlarged, fragmentary top plan view of the cutter station, showing a transformer to be processed.

Each of the attach blades 211 include a rigid steel plate 230 equipped with suitably chamfered mounting orifices 232 which mate with orifices 207 (FIG. 11) in recesses 210. The right edge of the plate 230 is sharpened at its bottom end to a tapered cutting edge 236 (FIG. 19). As viewed in FIG. 19, a suitable fastener 239 will mate the blade 211 onto the attack plate 196. In the best mode a separate blade 211 is disposed on each side of the forwardly projecting penetrator 218.

Figure 18:
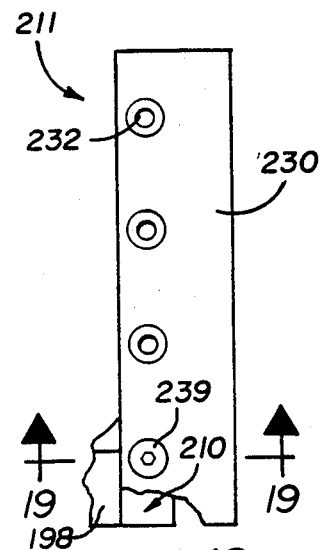
FIG. 18 is a fragmentary, top plan view of a penetrating blade.
Figure 17:
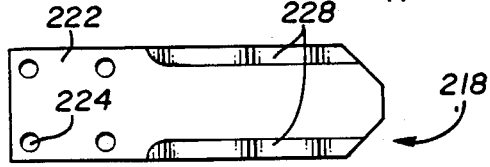
FIG. 17 is a bottom plan view of the penetrator taken generally along line 17—17 of FIG. 15.
Figure 23:
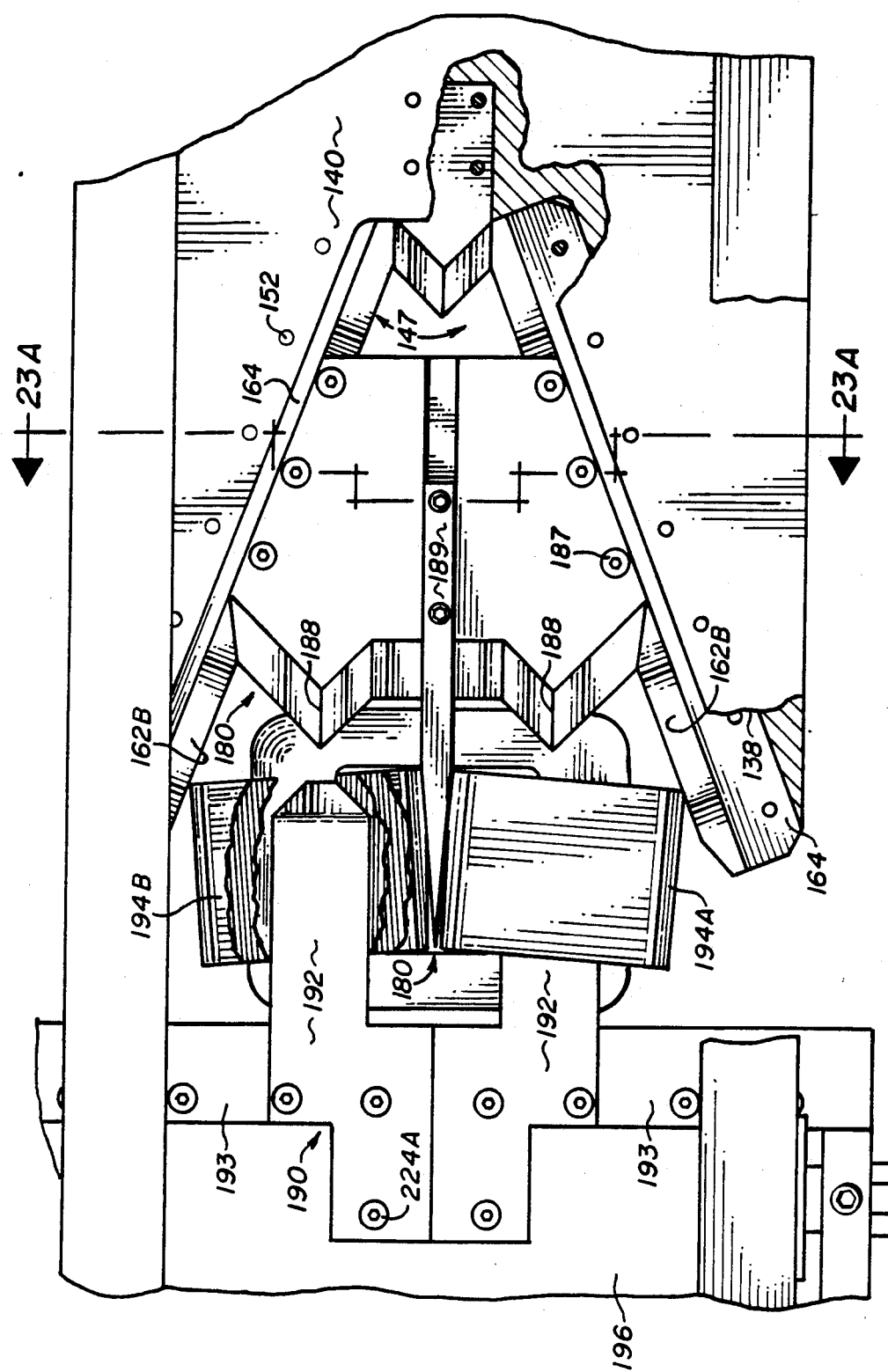
FIG. 23 is a fragmentary, top plan view of an alternative embodiment adapted for core-form transformers.
Figure 23A:
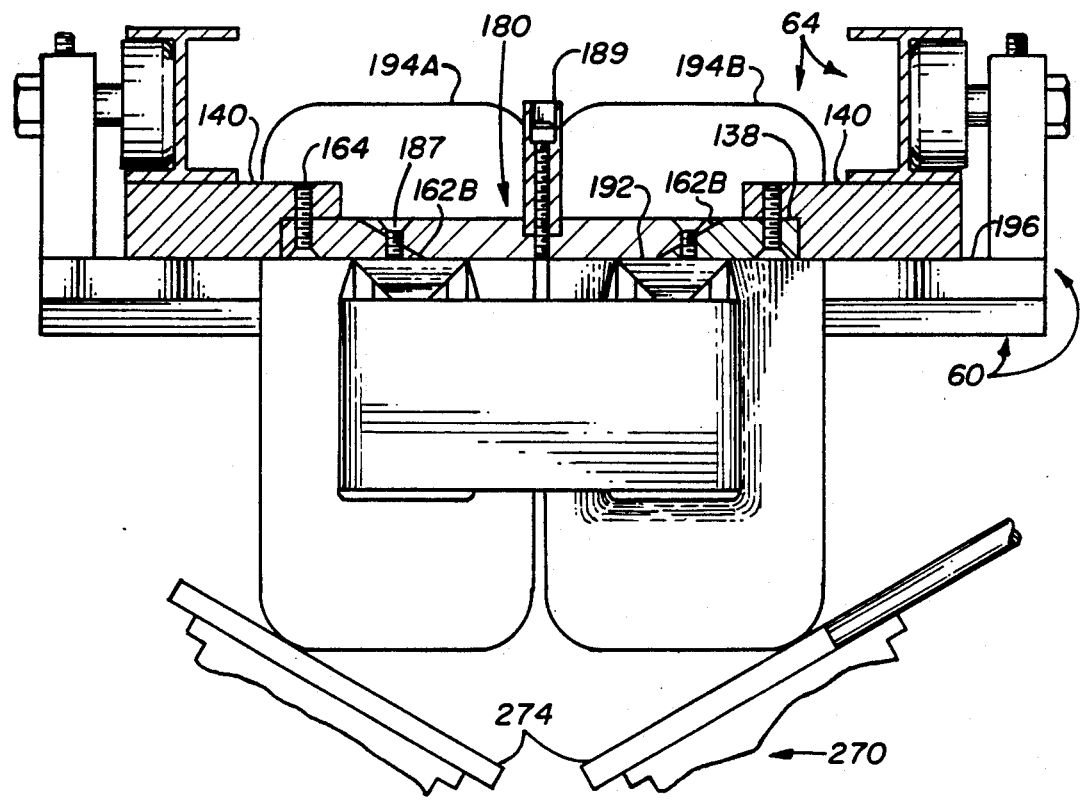
FIG. 23A is a fragmentary sectional view taken generally along line 23A—23A of FIG. 23; and, FIG. 24 is a schematic hydraulic diagram showing the best mode.

Core form transformers are best handled by the alternative cutting blade system 180 seen in FIG. 23A. The outer edges of plate 180 are configured substantially the same as the outermost edges of previously described cutter blade 147. Blade 180 will nest upon blade 147 within the notch in the cutter mounting plate 138 described previously, and it is secured by conventional screws 187. It includes a pair of spaced apart cutter blade prongs 188 disposed on opposite sides of a central, elongated knife 189. Prongs 188 forcibly penetrate the twin windings of a core form transformer during transformer processing. In core form transformer processing, it is preferred to have an alternative attack system generally designated by the reference numeral 190. It includes a pair of spaced apart prongs 192. They are mounted to the attack system mounting plate 196 through conventional bolts 224A. Rearward, blades 193 at opposite sides of the twin attach penetrator system 192 project on opposite sides therefrom, and function the same as blades 211 previously discussed (FIG. 18).

Thus penetrator's 192 will project generally toward prongs 188 during the transformer destruction process. Again, windings are sheared by compression of the attack and cutter systems.

A pair of transformers 194A and 194B have been dismembered in FIG. 23. They have received a sharp initial stab from penetrator's 192, and destruction is further enhanced when their undersides are attacked by prongs 188 projecting from cutter blade 180. Concurrently, however, with compression of the cutter station and attack station the transformers will be viciously cut on their outermost edges by the outer diverging edges 162B of the alternative cutter 180. Cutter 180 may be mounted to the same cutter mounting plate previously described.

With attention directed now to FIGS. 2B, 2C, and 20–22, transformers are preferably delivered to the system through the moving conveyor system 54. Transformer 50B is in route to the receiving station. Transformer 50 has already been captured, and it is disposed generally above the receiving station, between the jaws of the cutter and attack systems. As appreciated from FIGS. 2A and 2B, the receiving station 48 generally comprises a gap between the adjacent conveyor sections 54. Preferably a lifting cradle, generally designated by the reference numeral 270 is employed to lift the transformer from the conveyor 54 up within the receiving station to a point between the now open attack and cutter systems.

The transformer handling cradle 270 (FIGS. 1, 2B) comprises a pair of sides 274, each of which is secured to a rotatable control axle 276 by suitable mounts 278. As best viewed in FIG. 1 the sides of each cradle 274 may be clasped together by rotation of shafts 276, which extend between suitable pillow blocks 279. The pillow blocks are secured to a frame plate 280 controlled by associated elevator generally designated by the reference numeral 288. Elevator 288 is employed to move incoming transformers vertically upwardly to an altitude at which they are most vulnerable to attack.

Elevator 288 comprises a rigid carriage generally designated by the reference numeral 290, which includes roller wheels 292 captivated within adjacent parallel I-beams 294. Hydraulic cylinder 287 (FIG. 1) controls the elevator through ram 297. Cylinder 287 is activated by flow control valve 289 (FIG. 24) which is pressured via line 291. Elevator 288 is thus slidably coupled between the I-beams 294 in the same fashion as the previously discussed attack carriage and cutter carriage. Hence transformer 52 may be elevated upwardly into a position substantially at the middle of the frame (as viewed in FIG. 1 and 2A). The transformer is initially attacked by the attack carriage 194, which moves to the left as viewed in FIG. 20, and viciously stabs the transformer with its penetrator 218. However, during this interval when the transformer to be attacked is elevated in the receiving station, it is temporarily braced at its rear by a pusher plate, generally designated by the reference numeral 249.

Figure 22:
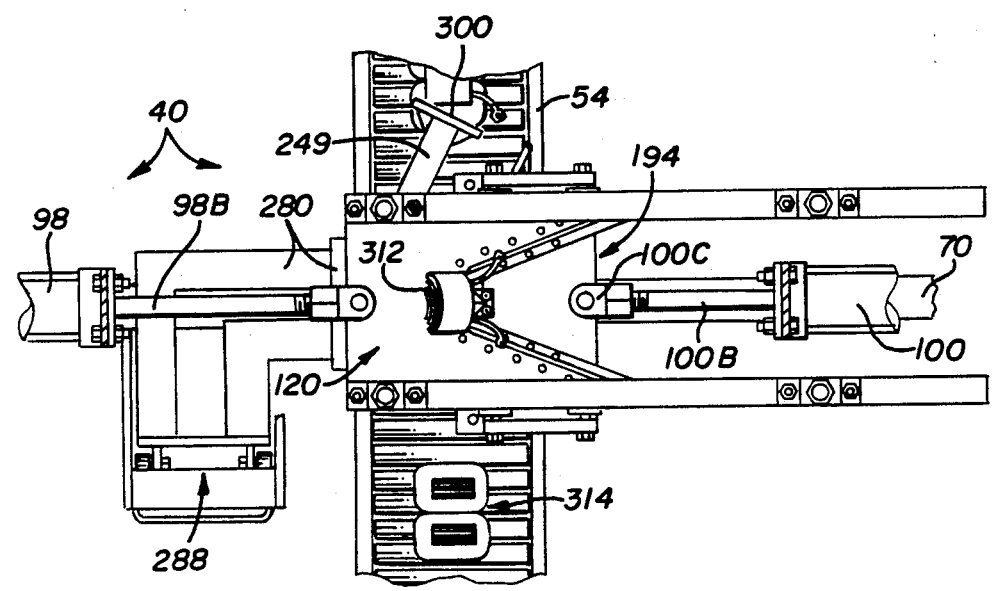
FIG. 22 is a view similar to FIGS. 20 and 21 but showing the cutting process.

Pusher plate 249 includes a mandrel 251 rotatably secured by a bolt 253 to clevis 98C. It terminates in a generally rectangular end plate 300 (FIG. 2A, 20) against which the target transformer is initially pushed when the attack carriage 194 is first activated. Since the movement of the transformer is resisted by the plate 300, it is viciously stabbed by the penetrator 218. When the attack plate is thereafter moved away from the pusher plate, the impaled transformer moves with it, the pusher plate 249 can then be moved out of the way as illustrated in FIG. 21 and 22.

Figure 21:
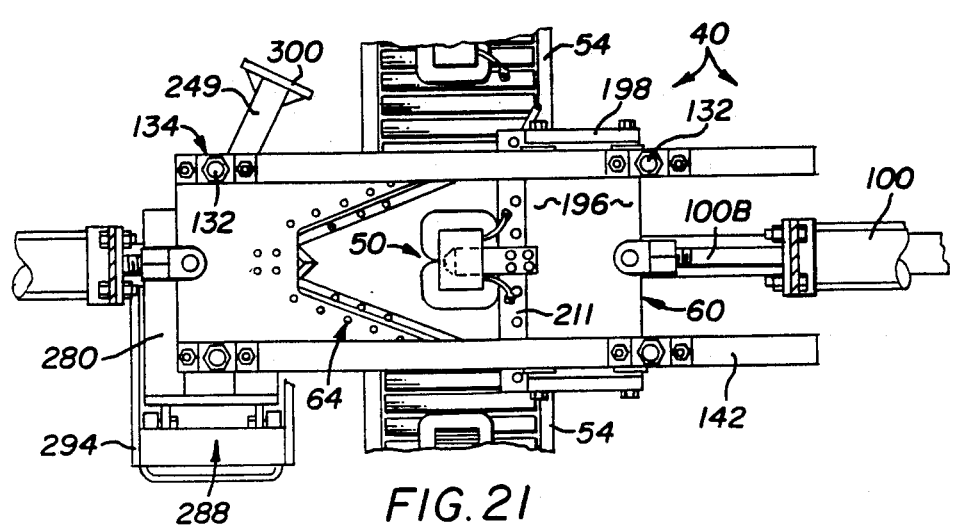
FIG. 21 is a view similar to FIG. 20 but showing the transformer immediately after being penetrated but prior to cutting.

Immediately after the pusher plate is withdrawn, the transformer is suspended above the receiving station as illustrated in FIG. 21, impaled upon the penetrator 218. At this point the cutter carriage 120 can be moved towards the transformer, and/or the attack carriage 194 can be moved towards the cutter plate. Depending upon the geometry of the transformer, the amount of deflection of the cutter plate will vary. It is important in operation to maintain the transformer approximately centered above the receiving station. Hence in FIG. 22, the attack carriage has been moved somewhat to the left, and the cutter plate has been moved towards the right (as viewed in FIG. 22), When the cutter plate engages the transformer the blade prong 168 will first penetrate the windings opposite the pusher plate 218, and a section of windings, generally designated by the reference numeral 312 (FIG. 22) will be liberated.

The remains of the transformer will drop below the receiving station, onto the sides 274 of the cradle, and they may be lowered and displaced onto the conveyor 54. Hence disassociated transformer sections 314 (FIG. 22) will be outputted from the apparatus.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A system for dismantling used power transformers to facilitate the subsequent recovery of the internal metal constituents thereof for subsequent recycling, said system comprising:
   rigid frame means adapted to be disposed upon a supporting surface;
   receiving station means into which transformers to be processed are serially inputted for processing;
   attack means for initially capturing transformers to be processed;
   cutter means for shearing the windings of transformers to be processed; and,
   power means for selectively compressing said attack means and said cutter means together for forcibly dismantling transformers captured therebetween.

2. The system as defined in claim 1 wherein said attack means comprises penetrator means for initially stabbing a transformer to be processed.

3. The system as defined in claim 2 wherein said system comprises pusher plate means for selectively bracing a transformer when the transformer is stabbed by said penetrator means to insure positive initial engagement of said transformer with said attack means.

4. The system as defined in claim 3 wherein said attack means comprises blade means associated with said penetrator means for aiding in the shearing of a transformer when said attack means and said cutter means are compressed together.

5. The system as defined in claim 1 wherein said receiving station means comprises elevator means for selectively moving transformers to be processed into operative alignment between said attack means and said cutter means.

6. The system as defined in claim 5 wherein said elevator means comprises means for grasping transformers.

7. The system as defined in claim 1 wherein said frame means comprises an upper elongated top extending generally horizontally above said surface, and means slidably supported by said top for supporting said attack means and said cutter means.

8. The system as defined in claim 1 wherein said cutter means comprises a cutter carriage slidably movable with respect to said frame means, and said attack means comprises an attack carriage slidably movable relative to said frame means.

9. The system as defined in claim 8 including first actuator means for selectively moving said attack carriage toward or away from said cutter means and second actuator means for selectively moving said cutter carriage toward or away from said attack 10. The system as defined in claim 1 wherein said cutter means comprises:
a movable cutter carriage supported by said frame means;
a cutter mounting plate supported by said carriage; and
a removable cutter blade secured to said cutter mounting plate.

11. The system as defined in claim 10 wherein said attack means is suspended relative to said frame means by an attack carriage slidably coupled to and suspended from said cutter carriage.

12. The system as defined in claim 10 wherein said cutter blade comprises an open generally V-shaped mouth for gradually receiving the transformer and cutting the windings thereof.

13. The system as defined in claim 10 wherein said cutter blade comprises prong means for piercing and centering said transformer when said cutter means and said attack means are compressed together.

14. The system as defined in claim 13 wherein said cutter blade comprises opposed, outwardly diverging edges forming an angle between them of between forty and fifty degrees.

15. The system as defined in claim 11 wherein said cutter blade comprises a pair of spaced-apart cooperating prongs for piercing each of the twin winding sections of a core form transformer when said cutter means and said attack means are forced together.

16. The system as defined in claim 15 wherein said cutter blade comprises opposed, outwardly diverging edges forming an angle between them of between forty and fifty degrees.

17. The system as defined in claim 1 wherein said attack means is suspended relative to said frame means by an attack carriage slidably coupled to and suspended from said cutter carriage; and, said cutter blade comprises:
a movable cutter carriage supported by said frame means;
a cutter mounting plate supported by said carriage;
a removable cutter blade secured to said cutter mounting plate, said blade comprising:
an open generally V-shaped mouth for gradually receiving the transformer and cutting the windings thereof;
prong means for piercing and centering said transformer when said cutter means and said attack means are compressed together; and,
cooperating, outwardly diverging edges forming an angle between them of between forty and fifty degrees.

18. The system as defined in claim 17 wherein said attack means comprises penetrator means for initially stabbing a transformer to be processed and blade means associated with said penetrator means for aiding in the shearing of a transformer when said attack means and said cutter means are compressed together, and said system comprises pusher plate means for selectively bracing a transformer when the transformer is stabbed by said penetrator means to insure positive initial engagement of said transformer with said attack means.

19. The system as defined in claim 18 wherein said receiving station means comprises transformer handling means for selectively moving transformers to be processed into operative alignment between said attack means and said cutter means.

20. A system for dismantling power transformers, said system comprising:
rigid frame means adapted to be disposed upon a supporting surface;
receiving station means into which transformers to be processed are serially inputted for processing;
means for delivering transformers to said receiving station means;
attack means for initially capturing transformers to be processed, said attack means comprising an attack carriage slidably movable relative to said frame means;
cutter means for shearing the windings of transformers to be processed, said cutter means comprising a cutter carriage slidably movable relative to said frame means; and,
power means for selectively forcing said attack carriage and said cutter carriage together for forcibly cutting and dismantling transformers captured therebetween.

21. The system as defined in claim 20 wherein said attack means comprises outwardly projecting penetrator means for initially stabbing a transformer to be processed.

22. The system as defined in claim 21 wherein said system comprises pusher plate means for bracing a transformer when the transformer is stabbed by said penetrator means to insure positive initial engagement of said transformer with said attack means.

23. The system as defined in claim 22 wherein said attack means comprises blade means associated with said penetrator means for aiding in the shearing of a transformer when said attack carriage and said cutter carriage are forced together.

24. The system as defined in claim 20 wherein said receiving station means comprises elevator means for selectively lifting transformers to be processed into operative alignment between said attack means and said cutter means.

25. The system as defined in claim 20 wherein said frame means comprises a pair of elongated, spaced apart top rails extending generally horizontally above said surface, and means slidably supported by said top rails for supporting said attack means and said cutter means.

26. The system as defined in claim 20 wherein said power means comprises first hydraulic means for selectively moving said attack carriage toward or away from said cutter means and second hydraulic means for selectively moving said cutter carriage toward or away from said attack means.

27. The system as defined in claim 20 wherein said cutter carriage comprises a cutter mounting plate and a removable cutter blade secured to said cutter mounting plate.

28. The system as defined in claim 27 wherein said attack carriage is slidably coupled to and suspended from said cutter carriage.

29. The system as defined in claim 28 wherein said cutter blade comprises an open generally V-shaped mouth for gradually receiving and then cutting transformers.

30. The system as defined in claim 29 wherein said cutter blade comprises a prong centered within said mouth for piercing and centering said transformer when said cutter means and said attack means are compressed together.

31. The system as defined in claim 30 wherein said cutter blade comprises opposed, outwardly diverging edges forming an angle between them of between forty and fifty degrees.

32. The system as defined in claim 30 wherein said cutter blade comprises a pair of spaced-apart cooperating prong for piercing each of the twin winding sections of a core form transformer when said cutter carriage and said attack carriage are forced together.

33. The system as defined in claim 32 wherein said cutter blade comprises opposed, outwardly diverging edges forming an angle between them of between forty and fifty degrees.

34. The system as defined in claim 32 wherein said attack means comprises twin penetrators for core form transformers.

35. A system for dismantling power transformers, said system comprising:
rigid frame means adapted to be disposed upon a supporting surface;
receiving station means into which transformers to be processed are serially inputted for subsequent processing;
means associated with said receiving station means for selectively moving transformers to be processed into operative alignment for dismantling;
conveyor means for delivering transformers to said receiving station means;
cutter means for shearing the windings of transformers to be processed, said cutter means comprising a movable cutter carriage slidably suspended from said frame means, a cutter blade mounting plate secured to said cutter carriage, and a cutter blade adapted to be secured to said cutter mounting plate, said blade comprising an open generally V-shaped mouth for gradually receiving and then cutting transformers;
attack means for initially capturing transformers to be processed, said attack means comprising an attack carriage slidably suspended from said cutter carriage and penetrator means for initially stabbing a transformer to be processed;
means for selectively bracing a transformer when the transformer is stabbed by said penetrator means to insure positive initial engagement of said transformer with said attack means;
power means for selectively forcing said attack carriage and said cutter carriage together for forcibly cutting transformers captured therebetween, said power means comprising first hydraulic means for selectively moving said attack carriage toward or away from said cutter means and second hydraulic means for selectively moving said cutter carriage toward or away from said attack means.

36. The system as defined in claim 35 wherein said attack means comprises blade means associated with said penetrator means for aiding in the shearing of a transformer when said attack carriage and said cutter carriage are forced together.

37. The system as defined in claim 36 wherein said cutter blade comprises opposed, outwardly diverging edges forming an angle between them of between forty and fifty degrees.

38. The system as defined in claim 37 wherein said cutter blade comprises at least one prong disposed within said mouth for piercing and centering said transformer when said cutter means and said attack means are compressed together.

39. The system as defined in claim 38 wherein said cutter blade comprises a pair of spaced-apart cooperating prongs for piercing each of the twin winding sections of a core form transformer when said cutter carriage and said attack carriage are forced together.

40. The system as defined in claim 39 wherein said cutter blade comprises opposed, outwardly diverging edges forming an angle between them of between forty and fifty degrees.

41. The system as defined in claim 39 wherein said attack plate comprises twin penetrators for core form transformer processing.

42. A system for dismantling transformers to recover the internal metal constituents thereof for subsequent recycling, said system comprising:
rigid frame means adapted to be disposed upon a supporting surface, said frame means comprising a pair of elongated, spaced apart top rails extending generally horizontally above said supporting surface;
receiving station means into which transformers to be processed are serially inputted for processing;
means associated with said receiving station means for selectively lifting transformers to be processed into operative alignment for dismantling;
conveyor means for delivering transformers to said receiving station means;
cutter means for shearing the windings of transformers to be processed, said cutter means comprising a movable cutter carriage slidably suspended from said top rails, a cutter blade mounting plate secured to said cutter carriage, and a cutter blade adapted to be secured to said cutter mounting plate, said blade comprising an open generally V-shaped mouth for gradually receiving and then cutting transformers and at least one prong disposed within said mouth for piercing and centering said transformer;
attack means for initially capturing transformers to be processed, said attack means comprising an attack carriage slidably suspended from said cutter carriage and penetrator means extending outwardly from said attack means for initially stabbing a transformer to be processed;
means for selectively bracing a transformer when the transformer is first stabbed by said penetrator means to insure positive initial engagement of said transformer with said penetrator means;

power means for selectively forcing said attack carriage and said cutter carriage together for forcibly cutting transformers captured therebetween, said power means comprising first hydraulic means for selectively moving said attack carriage toward or away from said cutter means and second hydraulic means for selectively moving said cutter carriage toward or away from said attack means.

43. The system as defined in claim 42 wherein said attack means comprises blade means associated with said penetrator means for aiding in the shearing of a transformer when said attack carriage and said cutter carriage are forced together.

44. The system as defined in claim 43 wherein said cutter blade comprises opposed, outwardly diverging edges forming an angle between them of between forty and fifty degrees.

45. The system as defined in claim 44 wherein said cutter blade comprises a pair of spaced-apart cooperating prongs for piercing each of the twin winding sections of a core form transformer when said cutter carriage and said attack carriage are forced together.

46. The system as defined in claim 45 wherein said cutter blade comprises opposed, outwardly diverging edges forming an angle between them of between forty and fifty degrees.

* * * * *